Weaver & Allen,
Vent Plug.
No. 86,890.          Patented Feb. 9, 1869.
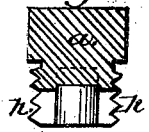
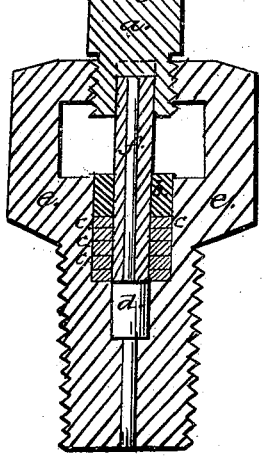
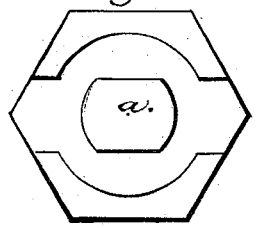
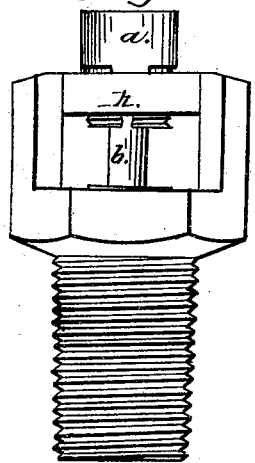
Witnesses:
William Hovey,
George G. Noah
Inventors:
George Weaver
Horatio N. Allen

United States Patent Office.

GEORGE WEAVER AND HORATIO N. ALLEN, OF BOSTON, MASSACHUSETTS, ASSIGNORS TO THEMSELVES AND E. R. CHENEY.

Letters Patent No. 86,890, dated February 9, 1869.

IMPROVEMENT IN VENT-PLUGS.

The Schedule referred to in these Letters Patent and making part of the same.

*To all whom it may concern:*

Be it known that we, GEORGE WEAVER and HORATIO N. ALLEN, of Boston, county of Suffolk, and State of Massachusetts, have invented a new and useful Device for Preventing Ale-Barrels and other Casks Containing Fermenting Liquors, Molasses, and other Expansive Fluids, from Bursting; and we do hereby declare that the following is a full, clear, and exact description thereof, reference being had to the accompanying drawing, making a part of this specification, in which—

Figure 5 is a pla.

Figure 4 is a section, and

Figures 3, 2, and 1, are details, to be referred to hereafter.

Our invention consists in a valve, of peculiar construction, to be placed in the head or other part of a cask, and which will open at any given pressure, and allow the gas or fluid to escape, should the pressure arise above the retaining-capacity of the cask, and which can be adjusted to retain any desired number of pounds to the square inch.

In the accompanying drawing—

$e$, fig. 4, is the shell or case, containing the valve and its equipments, and is provided with a screw-thread on its outer surface, and is screwed into the head or other part of a cask, or secured in any other manner to bring it in contact with the contents of the cask.

$b$ is a valve, with two stems, with a small hole, $f$, through its entire length, corresponding to the hole $g$ in the case $e$.

$a$ is a regulating-screw, and contains the valve-seat $i$, illustrated by dotted line.

The valve-seat is made of wood, leather, or other material, placed firmly in its position, as represented.

$c\ c$ are springs, of rubber, or other suitable material, made in a proper form, and placed, as shown, on one of the stems of the valve $b$.

$d$ is an enlargement of the passage $g$, designed to receive a portion of the valve-stem $b$, on which is placed the spring $c$, thereby preventing the valve from opening in an oblique direction.

That portion of the valve-case which contains the regulating-screw is placed within the cask, and in contact with its contents.

When the pressure in the cask rises to its assigned limit, the valve $b$ will raise off from its seat in the regulating-screw $a$, forcing it against the spring $c\ c$, and allow the gas or fluid to escape through the aperture $h$, fig. 5, into and through the passage $f\ d\ g$, fig. 4, to the open air, and close by the action of the spring, thereby securing it from bursting; also, under ordinary circumstances, preventing the escape of the contents of the cask.

What we claim as our invention, and desire to secure by Letters Patent, is—

The combination of valve $b$, provided with hole $f$, regulating-screw $a$, valve-seat $i$, spring $c$, main plain or hollow, and shell $e$, all constructed and arranged substantially as shown and described.

GEORGE WEAVER.
HORATIO N. ALLEN.

Witnesses:
A. C. CHASE,
ALPHEUS WISWELL.